United States Patent
Rao Padebettu et al.

(10) Patent No.: US 11,398,020 B2
(45) Date of Patent: Jul. 26, 2022

(54) GENERATING A COMPOSITE IMAGE

(71) Applicant: Facebook Technologies, LLC, Menlo Park, CA (US)

(72) Inventors: Rohit Rao Padebettu, Cupertino, CA (US); Steven Paul Lansel, East Palo Alto, CA (US); Todd Douglas Keeler, Fremont, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 9 days.

(21) Appl. No.: 17/132,229

(22) Filed: Dec. 23, 2020

(65) Prior Publication Data
US 2022/0198627 A1 Jun. 23, 2022

(51) Int. Cl.
*G06T 5/50* (2006.01)
*G06T 3/00* (2006.01)
*G06T 5/00* (2006.01)

(52) U.S. Cl.
CPC .............. *G06T 5/50* (2013.01); *G06T 3/0093* (2013.01); *G06T 5/006* (2013.01); *G06T 2207/10016* (2013.01); *G06T 2207/20004* (2013.01); *G06T 2207/20221* (2013.01)

(58) Field of Classification Search
CPC ......... G06T 5/50; G06T 3/0093; G06T 5/006; G06T 2207/10016; G06T 2207/20004; G06T 2207/20221
See application file for complete search history.

(56) References Cited

U.S. PATENT DOCUMENTS

2020/0051219 A1 * 2/2020 Pohl .................. G06T 5/006

OTHER PUBLICATIONS

International Search Report and Written Opinion for International Application No. PCT/US2021/059297, dated Mar. 9, 2022, 9 pages.
Lengyel J., et al., "Rendering with Coherent Layers," SIGGRAPH 97: Proceedings of the 24th Annual Conference on Computer Graphics and Interactive Techniques (SIGGRAPH), Aug. 3, 1997, pp. 233-242.

(Continued)

*Primary Examiner* — Jeffery A Brier
(74) *Attorney, Agent, or Firm* — Baker Botts L.L.P.

(57) ABSTRACT

In one embodiment, a method includes receiving a source image and its associated parameters from each of multiple image sources, associating each of the source images with a layer in a range of layers based on the parameters associated with the source images, the range of layers specifying a composition layering order of the source images, generating a corresponding customized distortion mesh for each particular source image in the source images based on the parameters associated with the particular source image and at least a portion of the parameters associated with each of the source images that is associated with any layer preceding a layer associated with the particular source image, modifying each of the source images using the corresponding customized distortion mesh, generating a composite image using the modified source images, and displaying the composite image as a frame in a video.

20 Claims, 9 Drawing Sheets

(56) References Cited

OTHER PUBLICATIONS

Porter T., et al., "Compositing Digital Images," SIGGRAPH 84: Proceedings of the 11th Annual Conference on Computer Graphics and Interactive Techniques, (SIGGRAPH), Jan. 1, 1984, vol. 18, No. 3, pp. 253-259.
Torborg J., et al., "Talisman: Commodity Realtime 3D Graphics for the PC," SIGGRAPH 96: Proceedings of the 23rd Annual Conference on Computer Graphics and Interactive Techniques (SIGGRAPH), Aug. 4, 1996, pp. 353-363.
Waveren J.V., "The Asynchronous Time Warp for Virtual Reality on Consumer Hardware," VRST 16: Proceedings of the 22nd ACM Conference on Virtual Reality Software and Technology (VRST), Nov. 2, 2016, pp. 37-46.

\* cited by examiner

GENERATING A COMPOSITE IMAGE

TECHNICAL FIELD

This disclosure generally relates to artificial-reality system, and in particular, related to generating a composite image for a frame of a video stream.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for generating a composite image for a frame of a video stream based on images from multiple sources. Contemporary media devices are expected to have high resolution, low latency displays. However, Graphics Processing Units (GPUs) on the media devices may not have enough computing capability to render images with the resolutions at the frame rates of the displays. To mitigate such a discrepancy between the computing capability and the desired resolutions of the rendered images, a computing device may prioritize a part of the screen and render only the prioritized part of the screen at a high resolution. In an application, the computing device may render an inset area (e.g., a central/foveal area) at a full frame rate while the computing device renders an outset area (a remaining area of the image) at a half frame rate. In another application, the computing device may access an image rendered at a low resolution. The computing device may apply a compute intensive upscaling algorithm to an area of the image while the computing device may apply a cheaper algorithm to the rest of the image. In yet another application, the computing device may perform a computing-intensive Chromatic Aberration Correction (CAC) to a part of the image while the computing device does not perform the CAC to the rest of the image.

Images on the display viewed via a lens system may undergo a distortion called 'lens distortion.' To counter this lens distortion, a complimentary distortion called 'barrel distortion' may need to be applied. A logical component of the computing device called a compositor module may handle the process of applying the barrel distortion using a distortion mesh to a rectangular image. The position of the vertices in the distortion mesh may inherently encode the necessary barrel distortion. The distortion may be then applied to the image by mapping the image onto the distortion mesh. The invention disclosed herein may enable an efficient mapping of the images from a number of image sources. The invention may eliminate misalignments and sharp transitions between the images from the number of image sources on the composite image.

A compositor module of a computing device may receive a source image and its associated parameters from each of n image sources. The n image sources may include at least two image sources. The parameters associated with each of the source images may comprise a layer parameter, clipping parameters, reprojection parameters, or blending parameters. The compositor module may associate each of the source images with a layer in a range of layers based on the layer parameter associated with the source images. The range of layers may specify a composition layering order of the source images. The clipping parameters associated with a source image may indicate a bounding area for the source image. The bounding area for the source image may be an area within the output image that is to be filled by the source image. The reprojection parameters associated with the source image may comprise information associated with one or more warping operations to be performed on the source image. In particular embodiments, the one or more warping operations may comprise a space warping operation. The reprojection parameters may comprise motion vectors in the source image. In particular embodiments, the one or more warping operations may comprise a time warping operation. The reprojection parameters may comprise a head position. The compositor module may update the bounding area for each of the source images based on an expected impact of the one or more warping operations. The compositor module may further update an updated bounding area for a first source image of the source images based on the updated bounding areas for second source images among the source images. Each of the second source images is associated with any layer preceding a layer associated with the first source image. For each of the second source images, the compositor module may subtract an intersection between the updated bounding area for the first source image and the updated bounding area for the second source image.

The compositor module may generate a customized distortion mesh corresponding to the first source image based on the parameters associated with the first source image and at least a portion of the parameters associated with each of the second source images. The compositor module may generate a distortion mesh that matches to the updated bounding area for the first source image. The updated bounding area for the first source image may be determined based on the clipping parameters and the reprojection parameters associated with the first source image and the clipping parameters and the reprojection parameters associated with each of the second source images. The compositor module may modify each of the source images using the corresponding customized distortion mesh. To modify the source image, the compositor module may perform the one or more warping operations on the source image based on the associated reprojection parameters. The compositor module may map the warped source image onto the corresponding customized distortion mesh. The compositor module may perform an alpha blending to a transition area for the source image. The blending parameter associated with the source image may comprise information associated with the transition area for the source image. The transition area may be a subject of an alpha blending. The transition area for the source image may be a subset of the updated bounding area for the source image. The blending parameters comprise a cutoff distance. A point within the cutoff distance from a boundary of the updated bounding area for the source image may belong to the transition area for the source image. The blending parameters associated with the source image may comprise a level of transparency to be applied to the transition area for the source image. The compositor module may apply the level of transparency to the transition area for the source image. The compositor module may generate a composite image using the modified source images. The compositor module may display the composite image as a frame in a video. The displayed composite image may be viewed by a user through a lens systems. The customized distortion mesh corresponding to each of the source images may be used to compensate a lens distortion caused by the lens system. The compositor module may send a composition result to each of the n image sources. The composition result may comprise parameter suggestions. The composition result may comprise a result code indicating whether the bounding area for the source image is fully, partially, or zero occluded by the bounding areas for the other source images. The parameter suggestions may comprise a new layer suggestion that is determined based on the result code. The image source may adjust parameters associated with a source image corresponding to a next frame based on the parameter suggestions.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
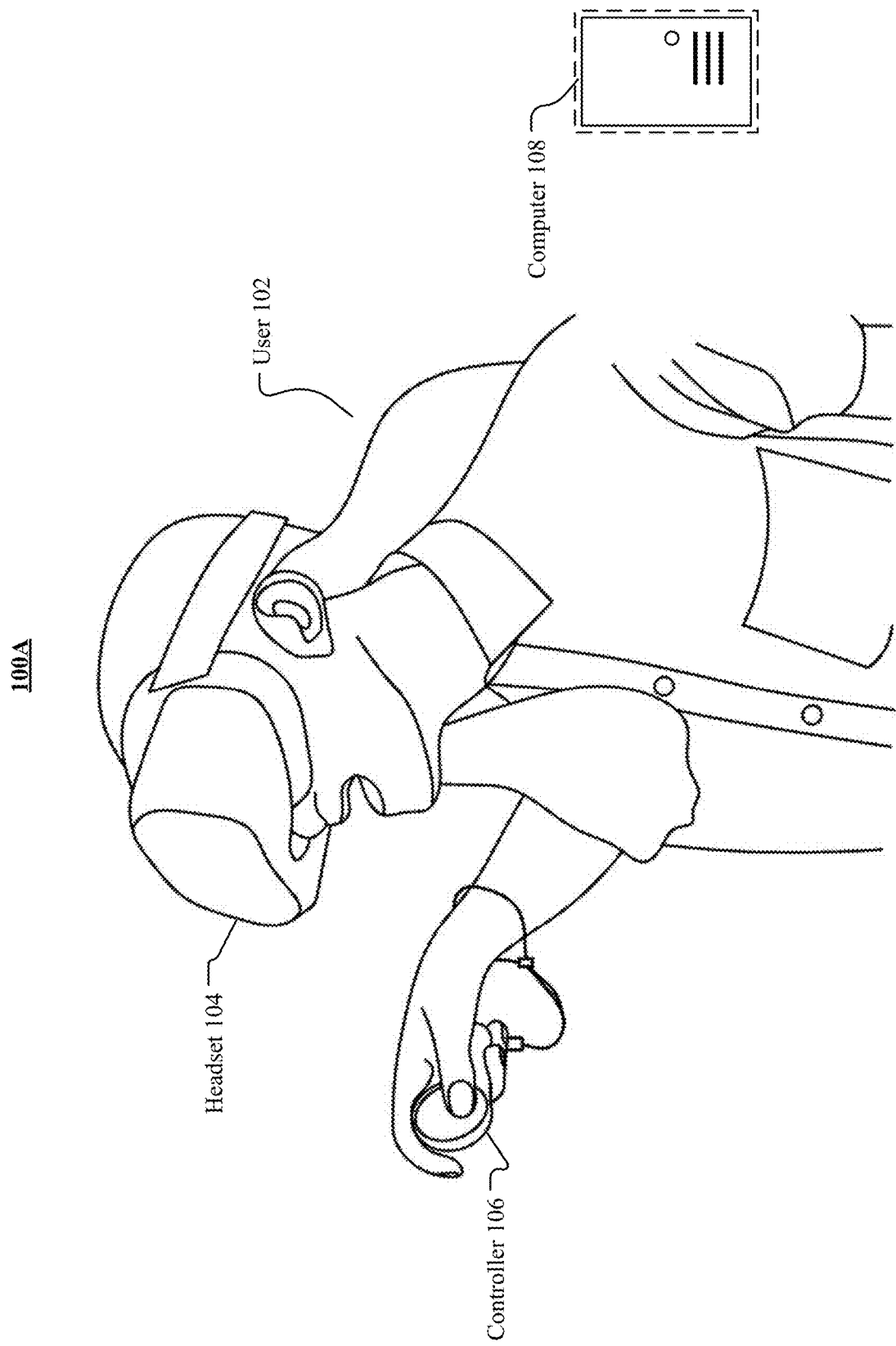
FIG. 1A illustrates an example artificial reality system.

FIG. 1A illustrates an example artificial reality system 100A. In particular embodiments, the artificial reality system 100A may comprise a headset 104, a controller 106, and a computing device 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may include a microphone to capture voice input from the user 102. The headset 104 may be referred as a head-mounted display (HMD). The controller 106 may comprise a trackpad and one or more buttons. The controller 106 may receive inputs from the user 102 and relay the inputs to the computing device 108. The controller 106 may also provide haptic feedback to the user 102. The computing device 108 may be connected to the headset 104 and the controller 106 through cables or wireless connections. The computing device 108 may control the headset 104 and the controller 106 to provide the artificial reality content to and receive inputs from the user 102. The computing device 108 may be a standalone host computing device, an on-board computing device integrated with the headset 104, a mobile device, or any other hardware platform capable of providing artificial reality content to and receiving inputs from the user 102.

Figure 1B:
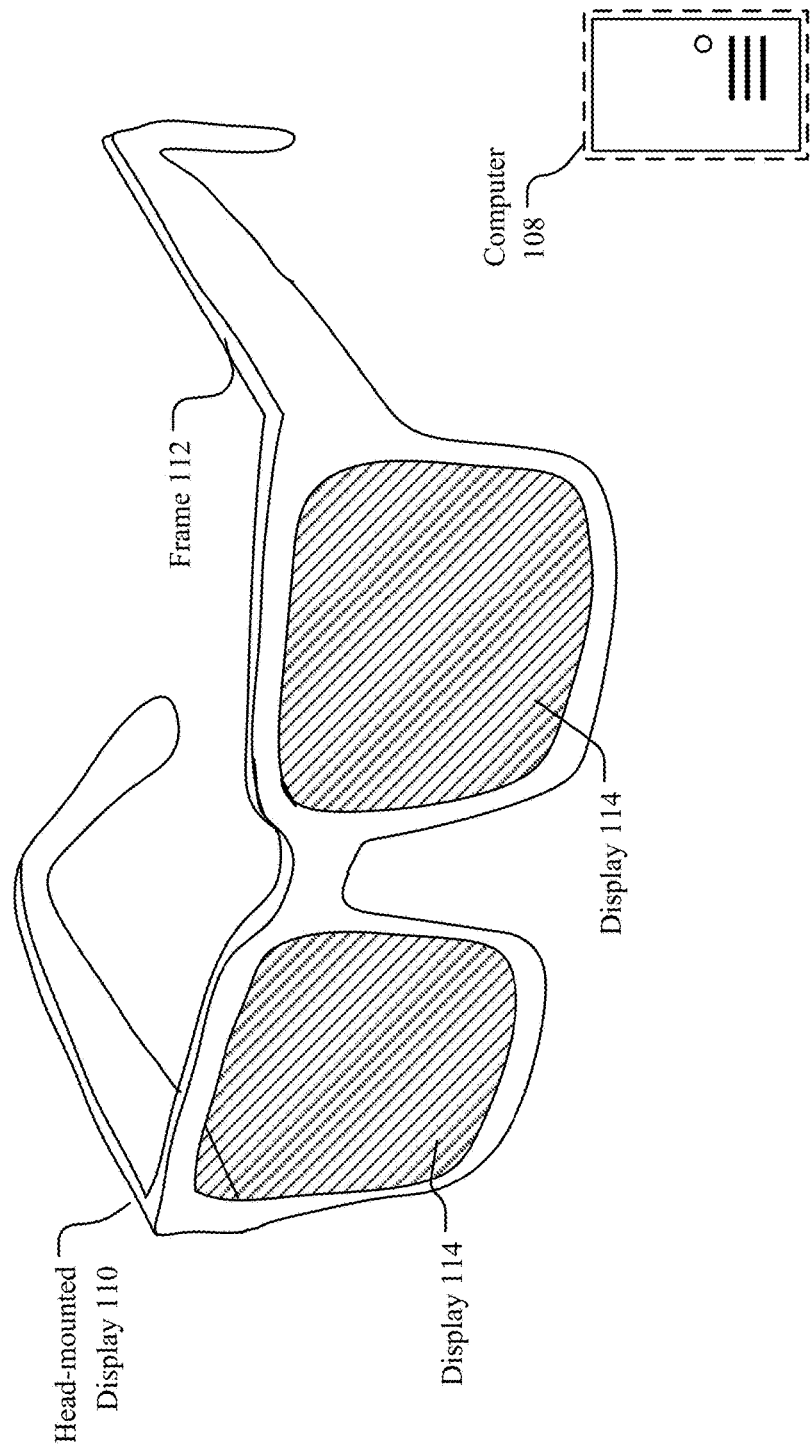
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing device 108. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The HMD 110 may include a microphone to capture voice input from the user. The augmented reality system 100B may further include a controller comprising a trackpad and one or more buttons. The controller may receive inputs from users and relay the inputs to the computing device 108. The controller may also provide haptic feedback to users. The computing device 108 may be connected to the HMD 110 and the controller through cables or wireless connections. The computing device 108 may control the HMD 110 and the controller to provide the augmented reality content to and receive inputs from users. The computing device 108 may be a standalone host computer device, an on-board computer device integrated with the HMD 110, a mobile device, or any other hardware platform capable of providing artificial reality content to and receiving inputs from users.

In particular embodiments, a compositor module of the computing device 108 may generate a composite image for a frame of a video stream based on images from a plurality of image sources. The artificial reality system 100A or the augmented reality system 100B may be expected to have high resolution, low latency displays. However, Graphics Processing Units (GPUs) on the computing device 108 may not have enough computing capability to render images with the resolutions at the frame rates of the displays. To mitigate such a discrepancy between the computing capability and the desired resolutions of the rendered images, the computing device 108 may prioritize a part of the screen and render only the prioritized part of the screen at a high resolution. The compositor module of the computing device 108 may composite the prioritized part and the other part into a single output image corresponding to a frame of a video stream.

Figure 2:
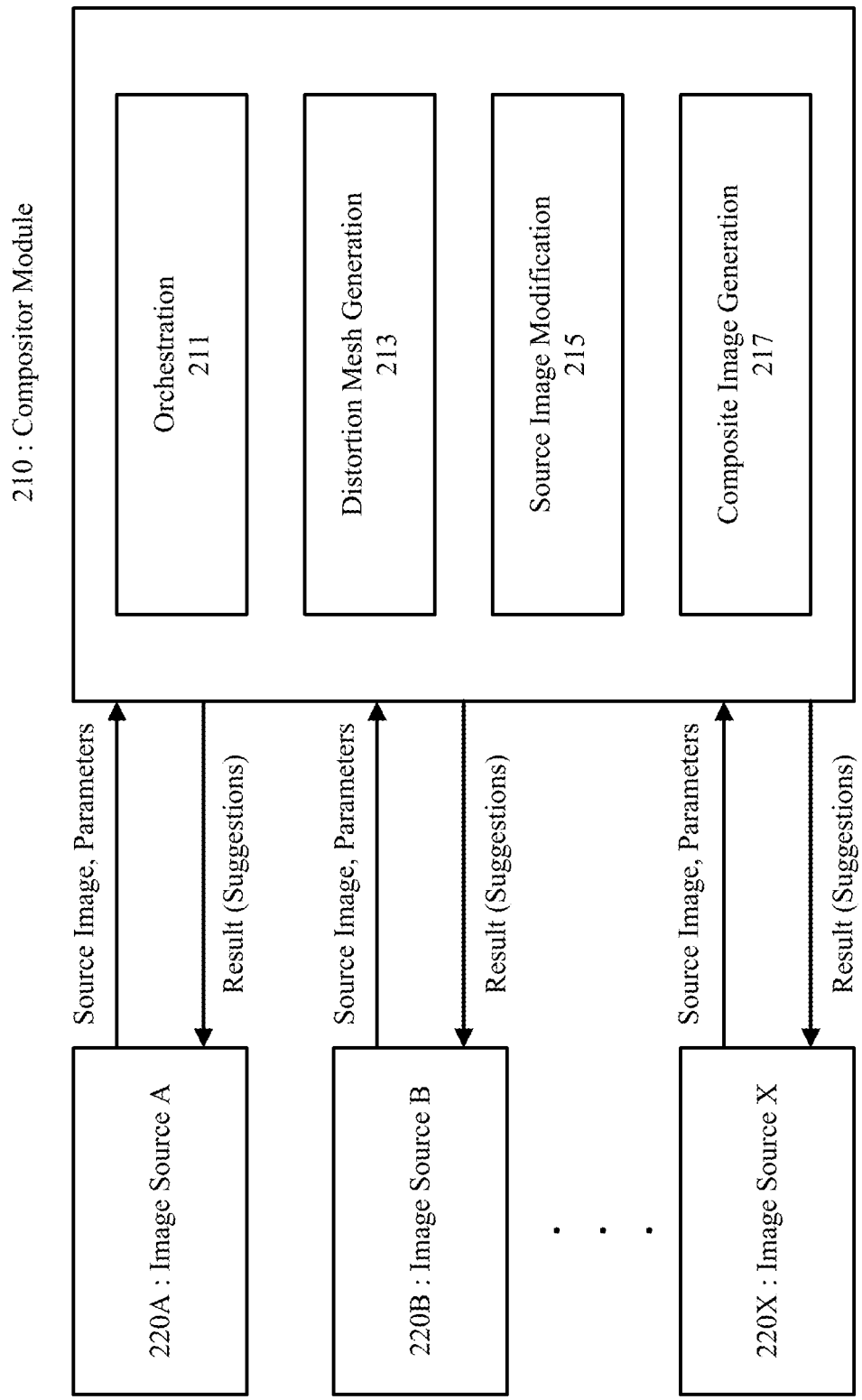
FIG. 2 illustrates an example system architecture for compositing images from a plurality of image sources.

FIG. 2 illustrates an example system architecture for compositing images from a plurality of image sources. The compositor module 210 may be a logical component of the computing device 108. The compositor module 210 may comprise an orchestration component 211, a distortion mesh generation component 213, a source image modification component 215 and a composite image generation component 217. The orchestration component 211 may associate each of the source images with a layer in a range of layers. The orchestration component 211 may also determine an updated bounding area for each of the source images based on the parameters associated with the source image. The distortion mesh generation component 213 may generate a customized distortion mesh corresponding to each of the source images. The source image modification component 215 may modify each of the source images using the corresponding customized distortion mesh. The composite image generation component 217 may generate a composite image using the modified source images. The compositor module 210 may communicate with a plurality of image sources 220A, 220B, and 220X. For each frame of a video stream, each of the plurality of image sources 220A, 220B, and 220X may provide a source image and its associated parameters. After compositing an output image corresponding to the frame of the video stream by processing the received source images, the compositor module 210 may send a composition result to each of the plurality of image sources 220A, 220B, and 220X. In particular embodiments, a composition result may comprise one or more suggestions that may be considered by the image source when to adjust the parameters associated with a source image for a next frame. In particular embodiments, the plurality of image sources 220A, 220B, and 220X may be a component of the computing device 108. In particular embodiments, at least a part of the plurality of image sources 220A, 220B, and 220X may be an entity outside of the computing device 108. Although this disclosure describes a particular system architecture for compositing images from a plurality of image sources, this disclosure contemplates any suitable system architecture for compositing images from a plurality of image sources.

In particular embodiments, generating a composite image using a plurality of images from a plurality of image sources may be used for a temporal foveated rendering. The computing device 108 may render an inset area (e.g., a central/foveal area) for all the frames of a video sequence. The computing device 108 may render an outset area (a remaining area of the image) for a half of the frames and use the outset area rendered for previous frames at the other half of the frames.

In particular embodiments, generating a composite image using a plurality of images from a plurality of image sources may be used for a super-resolution solution. The computing device 108 may access an image rendered at a low resolution. The computing device 108 may apply a compute intensive machine-learning based upscaling algorithm to an area of the image while the computing device 108 may apply a cheaper algorithm to the rest of the image.

In particular embodiments, generating a composite image using a plurality of images from a plurality of image sources may be used for recovering transmission errors. The computing device 108 may receive an image split into a plurality of data units from a second computing device such as a server. When one or more of the plurality of data units are missing, the computing device 108 may re-project one or more part of a previous frame corresponding to the missing data units into the current frame.

Figure 3:
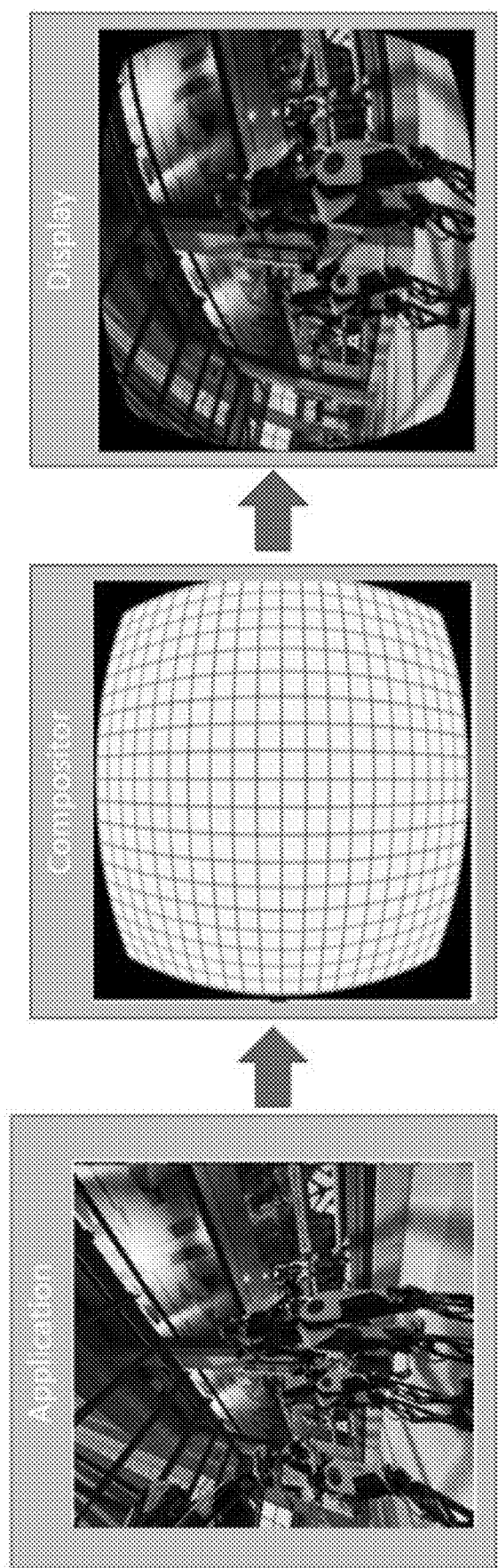
FIG. 3 illustrates an example application of the barrel distortion to an image using a distortion mesh.

In particular embodiments, the compositor 210 may apply the barrel distortion to an image using a distortion mesh to counter a lens distortion. Images on the display viewed via a lens system may undergo the lens distortion. The position of the vertices in the distortion mesh may inherently encode the necessary barrel distortion. The compositor 210 may map the image onto the distortion mesh to apply the barrel distortion to the image. FIG. 3 illustrates an example application of the barrel distortion to an image using a distortion mesh. As an example and not by way of limitation, illustrated in FIG. 3, an application generates an image to be displayed on an HMD 104 as depicted in (a) of FIG. 3. Since the display of the HMD 104 is viewed by a user through a lens system, the barrel distortion may need to be applied to the image in order to counter the lens distortion. The compositor module 210 may prepare a distortion mesh as depicted in (b) of FIG. 3. The compositor module 210 may apply the barrel distortion to the image by mapping the image onto the distortion mesh. The computing device 108 may display the distorted image on the HMD 104 as depicted in (c) of FIG. 3. In particular embodiments, one or more warping operations may also be performed on the image before the image is displayed.

In particular embodiments, the compositor module 210 of the computing device may receive a source image and its associated parameters from each of n image sources. The n image sources may include at least two image sources. The parameters associated with a source image may comprise a layer parameter, clipping parameters, reprojection parameters, or blending parameters. In particular embodiments, each of the n image sources may send only applicable parameters to the associated source image. In particular embodiments, the n image sources may be parts of the computing device 108 that the compositor module 210 belongs to. In particular embodiments, at least a part of the n image sources may be a component outside the computing device 108 that the compositor module 210 belongs to. Although this disclosure describes receiving a source image and its associated parameters in a particular manner, this disclosure contemplates a source image and its associated parameters in any suitable manner.

In particular embodiments, the parameters associated with each of the source images may comprise a layer parameter. The orchestration component 211 of the compositor module 210 may associate each of the source images with a layer in a range of layers based on the layer parameter associated with the source images. The range of layers may specify a composition layering order of the source images. As an example and not by way of limitation, the orchestration component 211 of the compositor module 210 may assign a layer in a range [0, n−1] to each of the n source images from the n image sources. A source image of layer i may have a higher priority than a source image of layer j if j is a larger number than i. In particular embodiments, the orchestration component 211 of the compositor module 210 may assign a layer in any range to each of the n source images in a way that a layer assigned to a source image may specify a layering order for the source image. Although this disclosure describes associating a layer to each of the source images in a particular manner, this disclosure contemplates associating a layer to each of the source images in any suitable manner.

Figure 4A:
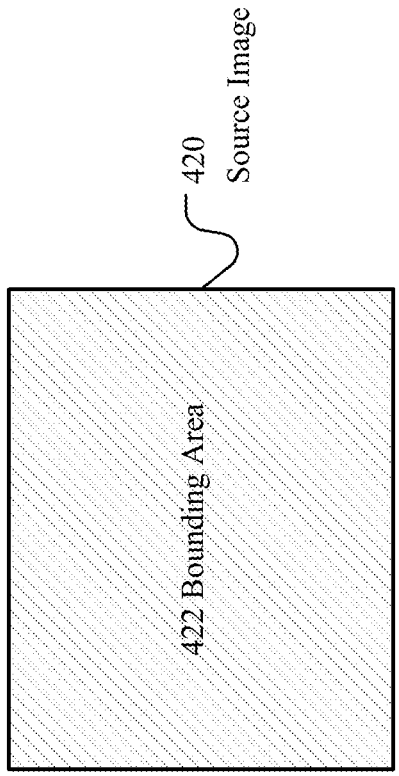
FIG. 4A illustrates example bounding areas for source images.

In particular embodiments, the parameters associated with each of the source images may comprise clipping parameters indicating a bounding area for the source image. The bounding area for the source image may be an area within the output image that is to be filled by the source image. The orchestration component 211 of the compositor module 210 may identify a bounding area for a source image based on the clipping parameters associated with the source image. In particular embodiments, the clipping parameters associated with a source image associated with a last layer in the range of layers may indicate that a whole area of the output image is the bounding area for the source image. In particular embodiments, an image source may not provide the clipping parameters to the compositor module 210 when the image source sends a source image to the compositor module 210. In such a case, the compositor module 210 may consider that whole area of the output image is the bounding area for the source image. FIG. 4A illustrates example bounding areas for source images. As an example and not by way of limitation, illustrated in FIG. 4A, the compositor module 210 receives two source images: the source image 410 and the source image 420. The orchestration component 211 of the compositor module 210 may assign layer 0 to the source image 410 and layer 1 to the source image 420 based on their associated layer parameters. The clipping parameters associated with the source image 410 may indicate that the area 412 is the bounding area for the source image 410. The clipping parameters associated with the source image 420 may indicate that the area 422, the whole area of the image, is the bounding area for the source image 420. In particular embodiments, the image source associated with the source image 420 may not provide the clipping parameters to the compositor module 210. The orchestration component 211 of the compositor module 210 may determine that the whole area of the image is the bounding area 422 for the source image 420. Although this disclosure describes identifying a bounding area for a source image in a particular manner, this disclosure contemplates identifying a bounding area for a source image in any suitable manner.

In particular embodiments, the parameters associated with the source image may comprise reprojection parameters. The reprojection parameters associated with the source image may comprise information associated with one or more warping operations to be performed on the source image. In particular embodiments, the one or more warping operations may comprise a space warping operation. The space warping operation may compensate movements of the objects in the image during a time period between a time instance when the image is rendered and a time instance when the image is displayed. The reprojection parameters may comprise motion vectors in the source image. The compositor module 210 may receive reprojection parameters associated with a space warping operation from an image source when the space warping operation needs to be performed on the bounding area of the source image. The motion vectors may be determined based on images corresponding to previous frames. In particular embodiments, determining the motion vectors may be based on optical flow. To perform a space warping operation, the compositor module 210 may distort the bounding area for the source image such that objects in motion in the bounding area are re-positioned using the motion vectors in the reprojection parameters. Although this disclosure describes receiving reprojection parameters associated with a space warping operation in a particular manner, this disclosure contemplates receiving reprojection parameters associated with a space warping operation in any suitable manner.

In particular embodiments, the one or more warping operations may comprise a time warping operation. A user may move her head during a time period between a time instance when the image is rendered and a time instance when the image is displayed to the user. A failure of compensating such head movement may break immersion. To compensate user's head position changes, time warping parameters may be computed based on the observed head position changes. When the compositor module 210 performs a time warping operation on a bounding area for a source image, the compositor module 210 may shift the bounding area for the source image to adjust for changes in head position. The reprojection parameters may comprise a head position. The compositor module 210 may receive reprojection parameters associated with a time warping operation from an image source when the time warping operation needs to be performed on the bounding area for the source image. Although this disclosure describes receiving reprojection parameters associated with a time warping operation in a particular manner, this disclosure contemplates receiving reprojection parameters associated with a time warping operation in any suitable manner.

In particular embodiments, the orchestration component 211 of the compositor module 210 may determine a first updated bounding area for each of the source images by updating the bounding area for each of the source images based on an expected impact of the one or more warping operations. In particular embodiments, the orchestration component 211 of the compositor module 210 may determine a second updated bounding area for a first source image of the source images based on the first updated bounding areas for second source images among the source images. Each of the second source images is associated with any layer preceding a layer associated with the first source image. For each of the second source images, the orchestration component 211 of the compositor module 210 may subtract an intersection between the second updated bounding area for the first source image and the first updated bounding area for the second source image from the second updated bounding area for the first source image. In particular embodiments, the orchestration component 211 of the compositor module 210 may subtract an intersection between the second updated bounding area for the first source image and the second updated bounding area for each of the second source images from the second updated bounding area for the first source image. Below are pseudo codes for updating bounding areas for the source images, where ba[i] is a bounding area for a source image of layer i, fba[i] is a first updated bounding area for the source image of layer i, sba[i] is a second updated bounding area for the source image of layer i, rp_param[i] is reprojection parameters associated with the source image of layer i, fn_update_ba_based_on_re_param(ba, rp_param) is a function that updates a bounding area, ba, based on reprojection parameters, rp_param, and fn_intersection(a, b) is a function that computes an intersection of areas a and b:

```
for i in a range (0, n-1)
    fba[i]=fn_update_ba_based_on_re_param(ba[i],
        rp_param[i])
for i in range(0, n-1)
    sba[i]=fba[i]
    for j in range(0, i-1)
        sba[i]=sba[i]-fn_intersection(sba[i], fba[j])
```

Figure 4B:
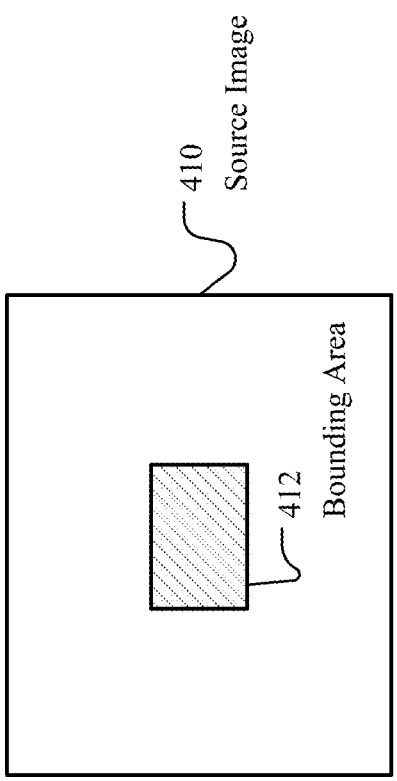
FIG. 4B illustrates example updated bounding areas for source images.
Figure 4B:
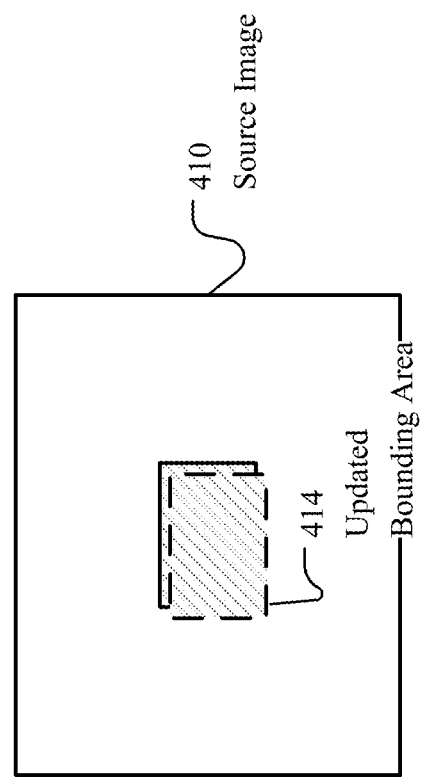

In the rest of this disclosure, an updated bounding area may refer to a second updated bounding area. FIG. 4B illustrates example updated bounding areas for source images. As an example and not by way of limitation, illustrated in FIG. 4B, continuing with a prior example illustrated in FIG. 4A, the projection parameters associated with the source image 410 may comprise parameters associated with a time warping operation. The orchestration component 211 of the compositor module 210 may determine the first updated bounding area 414 for the source image 410 based on an expected impact of the time warping operation. Because the source image 410 is associated with layer 0, the second updated bounding area for the source image 410 may be identical to the first updated bounding area 414 for the source image 410. The projection parameters associated with the source image 420 may comprise parameters associated with a space warping operation. The orchestration component 211 of the compositor module 210 may determine a first updated bounding area for the source image 420 based on an expected impact of the space warping operation. The orchestration component 211 of the compositor module 210 may set the first updated bounding area for the source image 420 as an initial value of the second updated bounding area for the source image 420. Then, the orchestration component 211 of the compositor module 210 may determine a second updated bounding area 424 for the source image 420 by subtracting the updated bounding area 414 for the source image 410 from the second updated bounding area for the source image 420. Because the updated bounding area 414 for the source image 410 is a subset of the first updated bounding area for the second image 420, an intersection between the first updated bounding area for the second image 420 and the updated bounding area 414 for the source image 410 would be the updated bounding area 414 for the source image 410. Although this disclosure describes updating bounding areas for the source images based on reprojection parameters in a particular manner, this disclosure contemplates updating bounding areas for the source images based on reprojection parameters in any suitable manner.

Figure 5:
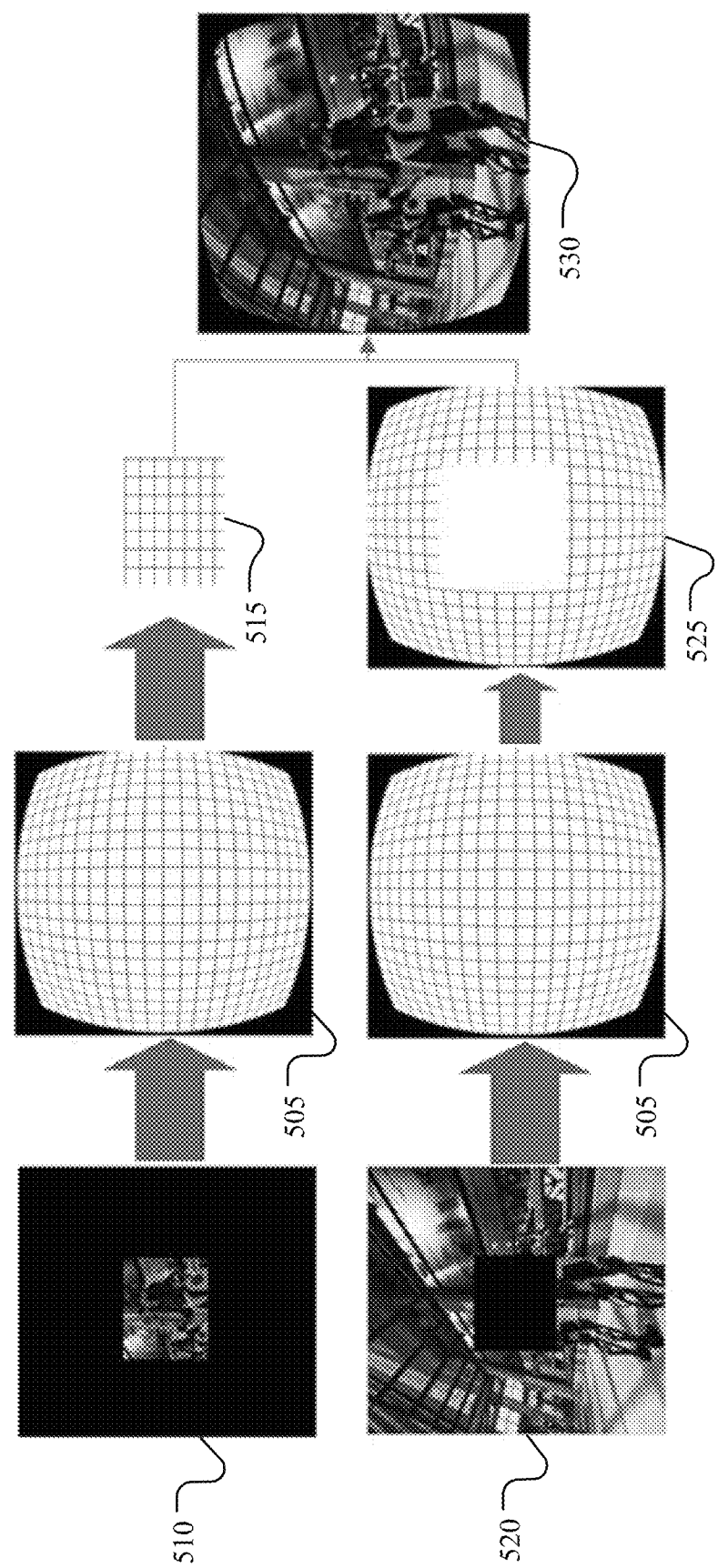
FIG. 5 illustrates an example process for generating a composite image based on source images.

In particular embodiments, the distortion mesh generation component 213 of the compositor module 210 may generate a customized distortion mesh corresponding to the first source image based on the parameters associated with the first source image and at least a portion of the parameters associated with each of the second source images, where each of the second source images is associated with a layer that precedes the layer associated with the first source image. The distortion mesh generation component 213 of the compositor module 210 may generate a customized distortion mesh that matches to the second updated bounding area for the first source image. In particular embodiments, the distortion mesh generation component 213 of the compositor module 210 may generate the customized distortion mesh by clipping a distortion mesh for the entire output image to make the customized distortion mesh match to the second updated bounding area for the first source image. The first updated bounding area for the first source image may be determined based on the clipping parameters and the reprojection parameters associated with the first source image. The second updated bounding area for the first source image may be determined based on the first updated bounding area for the first source image and the first updated bounding area for each of the second source images. The first updated bounding area for a second source image may be determined based on the clipping parameters and the reprojection parameters associated with the second source image. Therefore, the customized distortion mesh corresponding to the first source image may be generated based on the parameters associated with the first source image and the parameters associated with each of the second source images. FIG. 5 illustrates an example process for generating a composite image based on source images. As an example and not by way of limitation, illustrated in FIG. 5, the orchestration component 211 of the compositor module 210 has already determined updated bounding areas for the source images 510 and 520. The distortion mesh generation component 213 may generate a customized distortion mesh 515 that matches to the updated bounding area for the source image 510 by clipping the entire distortion mesh 505 to make the customized distortion mesh 515 match to the updated bounding area for the source image 510. The distortion mesh generation component 213 may generate a customized distortion mesh 525 that matches to the updated bounding area for the source image 520 by clipping the entire distortion mesh 505 to make the customized distortion mesh 525 match to the updated bounding area for the source image 520. Although this disclosure describes generating a customized distortion mesh that matches to the updated bounding area of the source image in a particular manner, this disclosure contemplates generating a customized distortion mesh that matches to the updated bounding area of the source image in any suitable manner.

In particular embodiments, the source image modification component 215 of the compositor module 210 may modify each of the source images using the corresponding customized distortion mesh. The source image modification component 215 of the compositor module 210 may perform the one or more warping operations on the source image based on the associated reprojection parameters if the reprojection parameters associated with the source image is provided from the corresponding image source. The source image modification component 215 of compositor module 210 may map the warped source image onto the corresponding customized distortion mesh. The source image modification component 215 of compositor module 210 may perform an alpha blending to a transition area for the source image if the blending parameters associated with the source image is provided from the corresponding image source. In particular embodiments, the source image modification component 215 of the compositor module 210 may perform the one or more warping operations on the source image, map the source image onto the corresponding customized distortion mesh, and perform an alpha blending to the transition area for the source image at the same time. In particular embodiments, the source image modification component 215 of the compositor module 210 may perform the three operations on the source image at any suitable order. Although this disclosure describes modifying a source image using the corresponding customized distortion mesh in a particular manner, this disclosure contemplates modifying a source image using the corresponding customized distortion mesh in any suitable manner.

In particular embodiments, to modify the source image, the source image modification component 215 of the compositor module 210 may perform the one or more warping operations on the source image based on the associated reprojection parameters. As an example and not by way of limitation, continuing with a prior example illustrated in FIG. 4B, the source image modification component 215 of the compositor module 210 may perform the time warping operation on the source image 410. After the time warping operation, the image on the original bounding area 412 may be shifted to the updated bounding area 414. The source image modification component 215 of the compositor module 210 may perform the space warping operation on the source image 420. The space warping operation may be performed on the updated bounding area 424 for the source image 420. Although this disclosure describes performing the one or more warping operations on the source image in a particular manner, this disclosure contemplates performing the one or more warping operations on the source image in any suitable manner.

In particular embodiments, the source image modification component 215 of the compositor module 210 may map the warped source image onto the corresponding customized distortion mesh. The customized distortion mesh may match the updated bounding area for the source image. As an example and not by way of limitation, continuing with a prior example illustrated in FIG. 5, the source image modification component 215 of the compositor module 210 may map the warped source image 510 onto the customized distortion mesh 515. Because the customized distortion mesh 515 was generated to match the updated bounding area for the source image 510, only the updated bounding area for the source image 510 may be mapped onto the customized distortion mesh 515. The source image modification component 215 of the compositor module 210 may map the warped source image 520 onto the customized distortion mesh 525. Because the customized distortion mesh 525 was generated to match the updated bounding area for the source image 520, only the updated bounding area for the source image 520 may be mapped onto the customized distortion mesh 525. Although this disclosure describes mapping a source image onto a corresponding customized distortion mesh in a particular manner, this disclosure contemplates mapping a source image onto a corresponding customized distortion mesh in any suitable manner.

Figure 6:
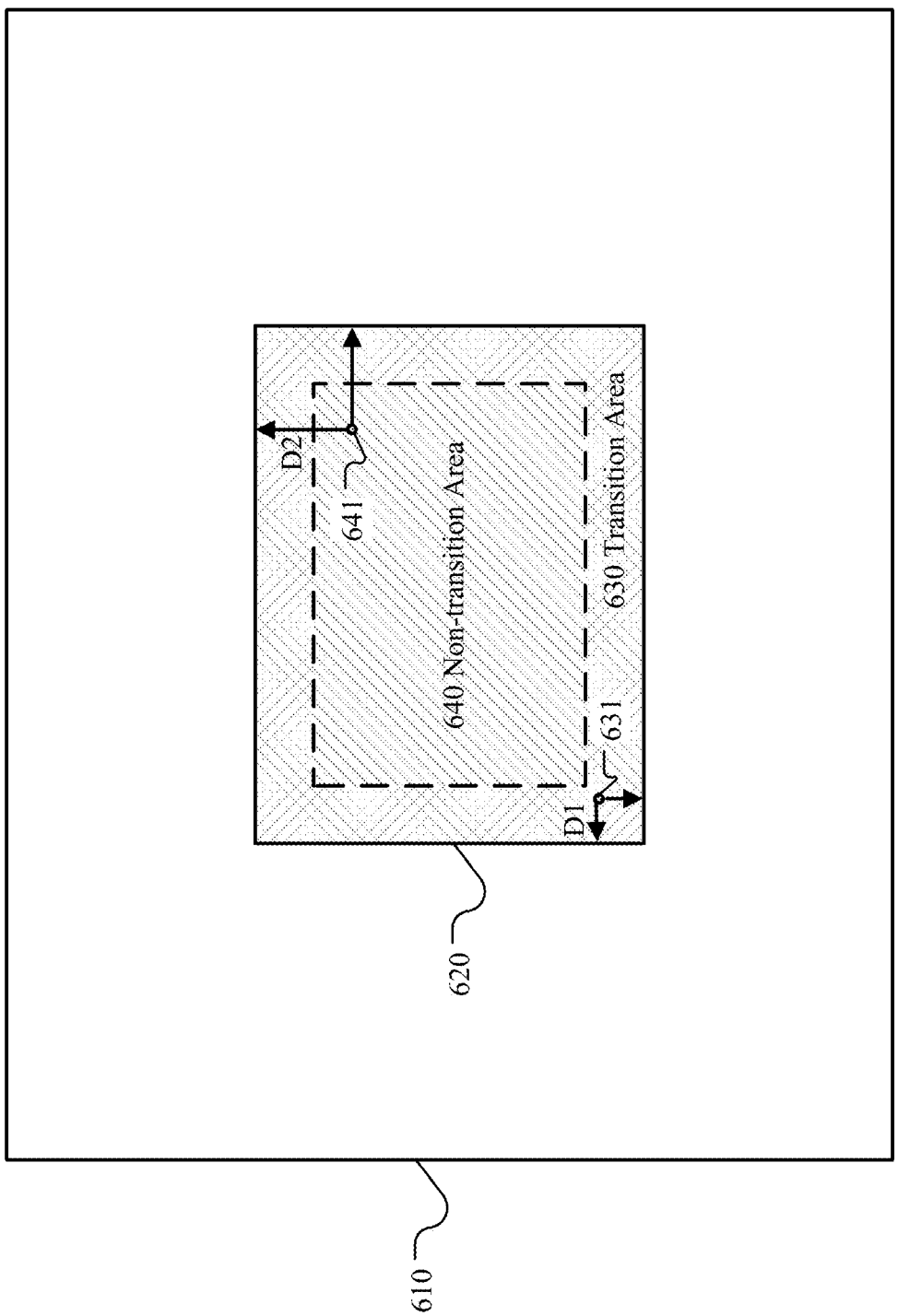
FIG. 6 illustrates an example transition area defined by a cutoff distance.

In particular embodiments, the source image modification component 215 of the compositor module 210 may perform an alpha blending to a transition area for the source image. The parameters associated with the source image may comprise blending parameters. The blending parameter associated with the source image may comprise information associated with a transition area for the source image. The transition area may be a subject of an alpha blending. The transition area for the source image may be a subset of the updated bounding area for the source image. The blending parameters comprise a cutoff distance. A point within the cutoff distance from a boundary of the updated bounding area for the source image may belong to the transition area for the source image. The blending parameters associated with the source image may comprise a level of transparency to be applied to the transition area for the source image. The compositor module 210 may apply the level of transparency to the transition area for the source image. FIG. 6 illustrates an example transition area defined by a cutoff distance. As an example and not by way of limitation, illustrated in FIG. 6, the compositor module 210 may have determined an updated bounding area 620 for a source image 610. The blending parameters associated with the source image 610 may comprise a cutoff distance. The source image modification component 215 of the compositor module 210 may determine an area within the cutoff distance from a boundary of the updated bounding area 620 as a transition area 630.

The source image modification component 215 of the compositor module 210 may apply a level of transparency provided within the blending parameters to a point 631 because a shorted distance D1 of the point 631 from the boundary of the updated bounding area is shorter than the cutoff distance. The source image modification component 215 of the compositor module 210 may not apply the level of transparency to a point 641 because a shorted distance D2 of the point 641 from the boundary of the updated bounding area is larger than the cutoff distance. The area that is beyond the cutoff distance from the boundary of the updated bounding area 620 may be referred to as a non-transition area 640. Although this disclosure describes performing an alpha blending to a transition area of a source image based on the blending parameters in a particular manner, this disclosure contemplates performing an alpha blending to a transition area of a source image based on the blending parameters in any suitable manner.

In particular embodiments, the composite image generation component 217 of the compositor module 210 may generate a composite image using the modified source images. In particular embodiments, the composite image generation component 217 of the compositor module 210 may composite the distortion mesh-mapped source images in a layering order determined by corresponding layers to generate a composite image. As an example and not by way of limitation, continuing with a prior example illustrated in FIG. 5, the composite image generation component 217 of the compositor module 210 may composite the source image 510 that is mapped with the customized distortion mesh 515 and the source image 520 that is mapped with the customized distortion mesh 525 to generate a composite image 530. One or more warping operations may have been performed to each of the source images 510 and 520. Alpha blending operation may have been performed to a transition area of each of the source images 510 and 520. Although this disclosure describes generating a composite image based on source images in a particular manner, this disclosure contemplates generating a composite image based on source images in any suitable manner.

In particular embodiments, the compositor module 210 may display the composite image as a frame in a video. The displayed composite image may be viewed by a user through a lens systems. The customized distortion mesh corresponding to each of the source images may be used to compensate a lens distortion caused by the lens system. As an example and not by way of limitation, the composite image may be displayed on an HMD 104. The user 102 may look at the image through a lens system that causes a lens distortion. The barrel-distorted composite image may compensate the lens distortion. Although this disclosure describes displaying the composite image in a particular manner, this disclosure contemplates displaying the composite image in any suitable manner.

In particular embodiments, the compositor module 210 may send a composition result to each of then image sources. The composition result may comprise parameter suggestions. The composition result may comprise a result code indicating whether the bounding area for the source image is fully, partially, or zero occluded by the bounding areas for the other source images. The parameter suggestions may comprise a new layer suggestion that is determined based on the result code. The image source may adjust parameters associated with a source image corresponding to a next frame based on the parameter suggestions. As an example and not by way of limitation, illustrated in FIG. 2, the compositor module 210 may send a composition result to each of the image sources 220A, 220B, and 220X. The composition result may comprise a result code indicating SUCCESS, PARTIAL SUCCESS, or FAILURE. The value for the result code may be determined based on how much the updated bounding area for the corresponding source image is occluded by other source images. In particular embodiments, the compositor module 210 may provide one or more parameter suggestions to an image source. The image source may adjust the parameters for images corresponding to the future frames based on the parameter suggestions from the compositor module 210. Although this disclosure describes providing a composition result to each of the image sources in a particular manner, this disclosure contemplates providing a composition result to each of the image sources in any suitable manner.

Figure 7:
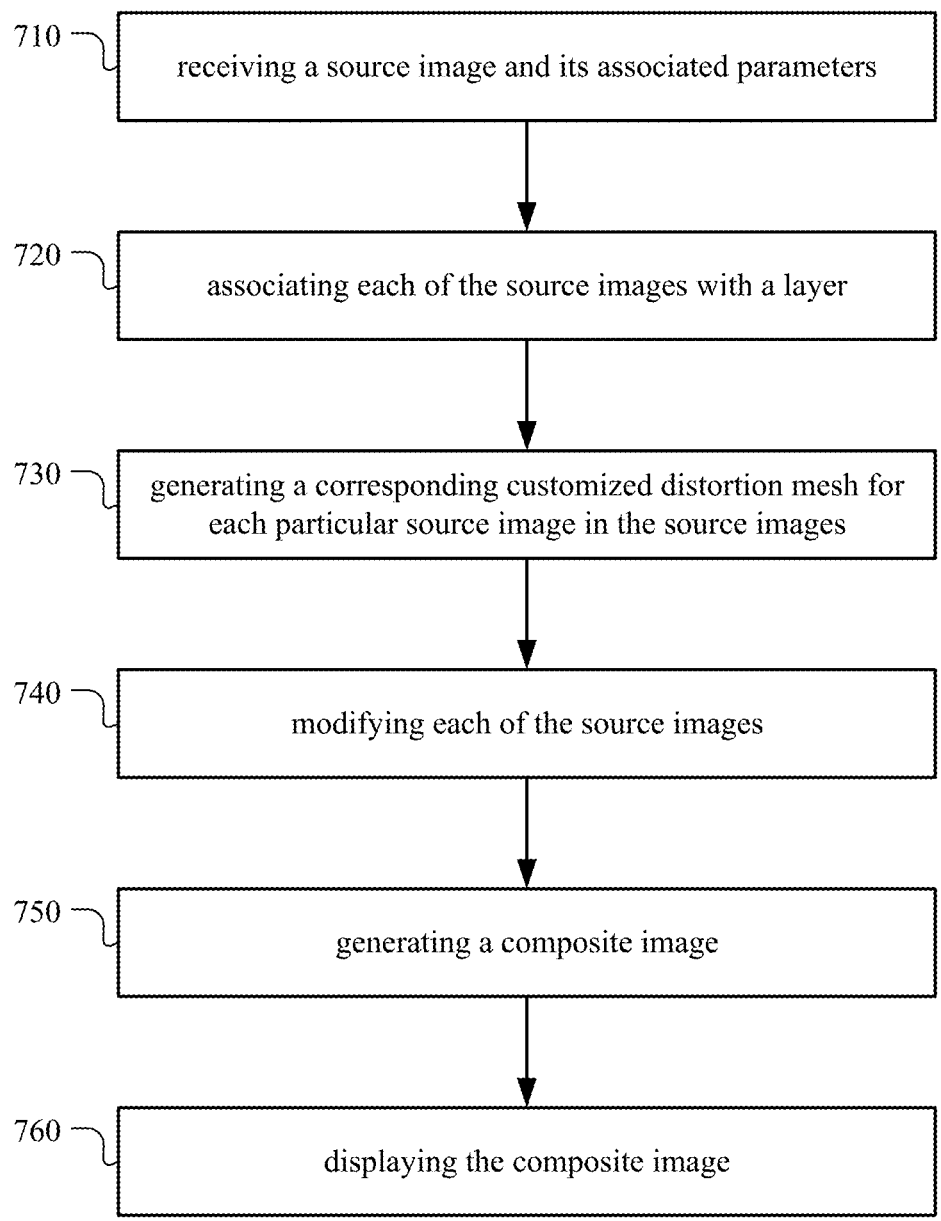
FIG. 7 illustrates an example method for generating a composite image based on a plurality of source images.

FIG. 7 illustrates an example method 700 for generating a composite image based on a plurality of source images. The method may begin at step 710, where the compositor module 210 may receive a source image and its associated parameters from each of n image sources. The n image sources may include at least two image sources. At step 720, the compositor module 210 may associate each of the source images with a layer in a range of layers based on the parameters associated with the source images. The range of layers may specify a composition layering order of the source images. At step 730, the compositor module 210 may generate a corresponding customized distortion mesh for each particular source image in the source images based on the parameters associated with the particular source image and at least a portion of the parameters associated with each of the source images that is associated with any layer preceding a layer associated with the particular source image. At step 740, the compositor module 210 may modify each of the source images using the corresponding customized distortion mesh. At step 750, the compositor module 210 may generate a composite image using the modified source images. At step 760, the compositor module 210 may display the composite image as a frame in a video. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating a composite image based on a plurality of source images including the particular steps of the method of FIG. 7, this disclosure contemplates any suitable method for generating a composite image based on a plurality of source images including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
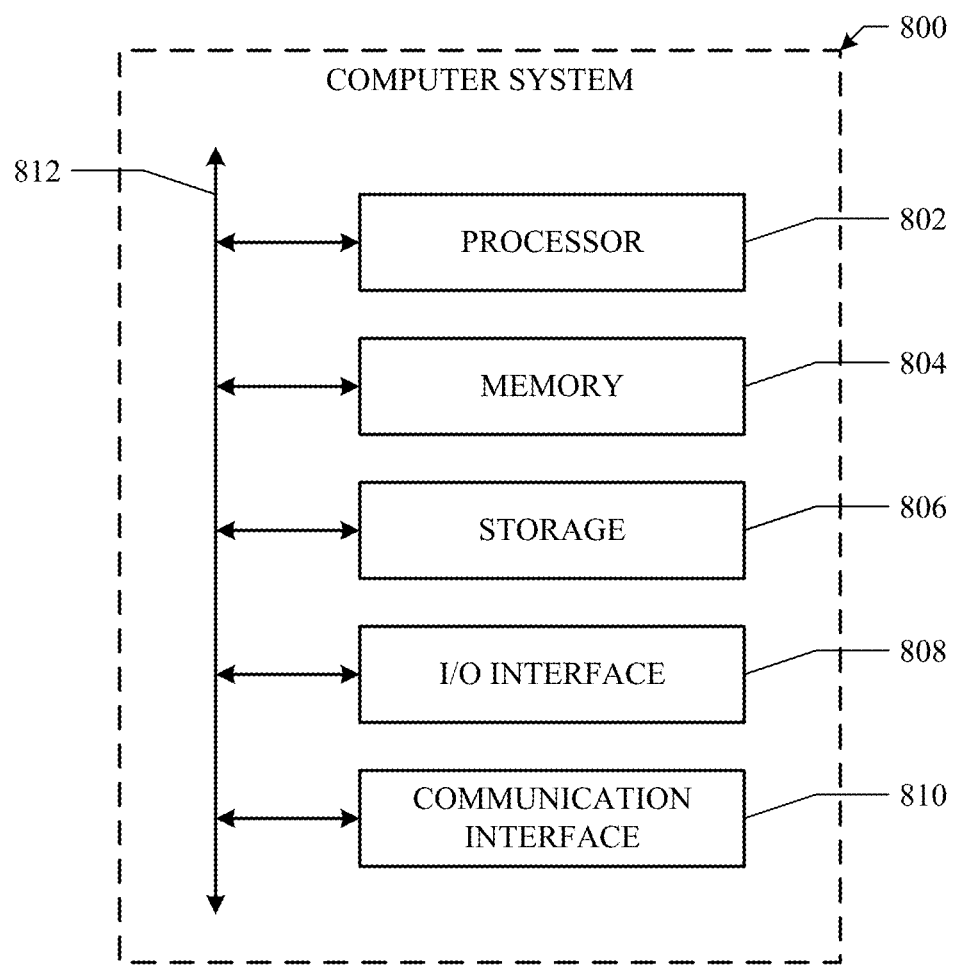
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a compositor module of a computing device:
    receiving, from each of n image sources, a source image and its associated parameters, wherein the n image sources include at least two image sources;
    associating each of the source images with a layer in a range of layers based on the parameters associated with the source images, the range of layers specifying a composition layering order of the source images;
    generating, for each particular source image in the source images, a corresponding customized distortion mesh based on the parameters associated with the particular source image and at least a portion of the parameters associated with each of the source images that is associated with any layer preceding a layer associated with the particular source image;
    modifying each of the source images using the corresponding customized distortion mesh;
    generating a composite image using the modified source images; and
    displaying the composite image as a frame in a video.

2. The method of claim 1, wherein the parameters associated with each of the source images comprise a layer parameter, and wherein a layer is associated with the source image based on the layer parameter associated with the source image.

3. The method of claim 1, wherein the parameters associated with each of the source images comprise clipping parameters indicating a bounding area for the source image, an area within the output image that is to be filled by the source image.

4. The method of claim 3, wherein the clipping parameters associated with a source image associated with a last layer in the range of layers indicate that a whole area of the output image is the bounding area for the source image.

5. The method of claim 3, wherein the parameters associated with the source image comprise reprojection parameters comprising information associated with one or more warping operations to be performed on the source image.

6. The method of claim 5, wherein the bounding area for the source image is updated based on an expected impact of the one or more warping operations.

7. The method of claim 6, wherein an updated bounding area for a first source image of the source images is further updated by subtracting, for each second image of the source images that is associated with any layer preceding a layer associated with the first source image, an intersection between the updated bounding area for the first source image and the updated bounding area for the second source image from the updated bounding area for the first source image.

8. The method of claim 7, wherein the parameters associated with the source image comprise blending parameters comprising information associated with a transition area for the source image, wherein the transition area is a subject of an alpha blending.

9. The method of claim 8, wherein the transition area for the source image is a subset of the updated bounding area for the source image, wherein the blending parameters comprise a cutoff distance, and wherein a point within the cutoff distance from a boundary of the updated bounding area for the source image belongs to the transition area for the source image.

10. The method of claim 8, wherein the blending parameters associated with the source image comprise a level of transparency to be applied to the transition area for the source image.

11. The method of claim 8, wherein generating the customized distortion mesh corresponding to each of the source images comprises generating a distortion mesh that matches to the updated bounding area for the source image.

12. The method of claim 11, wherein modifying each of the source images comprises:

performing the one or more warping operations on the source image based on the associated reprojection parameters;

mapping the warped source image onto the corresponding customized distortion mesh; and performing an alpha blending to the transition area for the source image.

13. The method of claim 5, wherein the one or more warping operations comprise a space warping operation, wherein the reprojection parameters comprise motion vectors in the source image.

14. The method of claim 5, wherein the one or more warping operations comprise a time warping operation, wherein the reprojection parameters comprise a head position.

15. The method of claim 3, further comprising:
sending, to each of the n image sources, a composition result comprising parameter suggestions, wherein the image source adjusts parameters associated with a source image corresponding to a next frame based on the parameter suggestions.

16. The method of claim 15, wherein the composition result comprises a result code indicating whether the bounding area for the source image is fully, partially or zero occluded by the bounding areas for the other source images among the source images.

17. The method of claim 16, wherein the parameter suggestions comprise a new layer suggestion that is determined based on the result code.

18. The method of claim 1, wherein the displayed composite image is viewed by a user through a lens systems, and wherein the customized distortion mesh corresponding to each of the source images is used to compensate a lens distortion caused by the lens system.

19. One or more computer-readable non-transitory storage media embodying software that is operable when executed to:
receive, from each of n image sources, a source image and its associated parameters, wherein the n image sources include at least two image sources;
associate each of the source images with a layer in a range of layers based on the parameters associated with the source images, the range of layers specifying a composition layering order of the source images;
generate, for each particular source image in the source images, a corresponding customized distortion mesh based on the parameters associated with the particular source image and at least a portion of the parameters associated with each of the source images that is associated with any layer preceding a layer associated with the particular source image;
modify each of the source images using the corresponding customized distortion mesh;
generate a composite image using the modified source images; and
display the composite image as a frame in a video.

20. A system comprising: one or more processors; and a non-transitory memory coupled to the processors comprising instructions executable by the processors, the processors operable when executing the instructions to:
receive, from each of n image sources, a source image and its associated parameters, wherein the n image sources include at least two image sources;
associate each of the source images with a layer in a range of layers based on the parameters associated with the source images, the range of layers specifying a composition layering order of the source images;
generate, for each particular source image in the source images, a corresponding customized distortion mesh based on the parameters associated with the particular source image and at least a portion of the parameters associated with each of the source images that is associated with any layer preceding a layer associated with the particular source image;
modify each of the source images using the corresponding customized distortion mesh;
generate a composite image using the modified source images; and
display the composite image as a frame in a video.

* * * * *